US006973295B2

(12) United States Patent  
Gunzelmann

(10) Patent No.: US 6,973,295 B2  
(45) Date of Patent: Dec. 6, 2005

(54) DETERMINATION OF A DIFFERENTIAL OFFSET IN A RADIO DEVICE AND RADIO DEVICE

(75) Inventor: Bertram Gunzelmann, Augsburg (DE)

(73) Assignee: Infineon Technologies AG, Munich (DE)

( * ) Notice: Subject to any disclaimer, the term of this patent is extended or adjusted under 35 U.S.C. 154(b) by 460 days.

(21) Appl. No.: 10/352,831

(22) Filed: Jan. 28, 2003

(65) Prior Publication Data

US 2003/0134604 A1 Jul. 17, 2003

Related U.S. Application Data

(63) Continuation of application No. PCT/DE01/02688, filed on Jul. 13, 2001.

(30) Foreign Application Priority Data

Jul. 28, 2000 (DE) ................................ 100 36 889

(51) Int. Cl.⁷ ................................................ H04B 1/74
(52) U.S. Cl. ................................ 455/115.1; 455/114.2; 455/69; 455/522; 455/63.1; 455/67.13
(58) Field of Search ................................ 455/522, 501, 455/63.1, 67.11, 67.13, 69, 115.1, 114.1–3

(56) References Cited

U.S. PATENT DOCUMENTS

| 4,656,643 | A | * | 4/1987 | Geneste et al. ............. 375/224 |
| 5,705,949 | A | * | 1/1998 | Alelyunas et al. .......... 329/304 |
| 5,757,114 | A | * | 5/1998 | Jaskie ....................... 313/309 |
| 5,787,114 | A |   | 7/1998 | Ramamurthy et al. ...... 375/221 |
| 6,266,517 | B1| * | 7/2001 | Fitzpatrick et al. ...... 455/114.3 |
| 6,377,620 | B1| * | 4/2002 | Ozluturk et al. ........... 375/235 |
| 6,704,551 | B2| * | 3/2004 | Riou et al. ............... 455/115.1 |
| 6,845,083 | B2| * | 1/2005 | Mollenkopf et al. ........ 370/215 |

FOREIGN PATENT DOCUMENTS

DE 199 04 377 C1 6/2000  
EP 0 905 940 A2 3/1999

* cited by examiner

Primary Examiner—Quochien B. Vuong  
Assistant Examiner—Christian A. Hannon  
(74) Attorney, Agent, or Firm—Laurence A. Greenberg; Werner H. Stemer; Ralph E. Locher

(57) ABSTRACT

A device for determining an offset value for an offset occurring in a differential transmission signal section of a radio device utilizes, for the purpose of determining the offset value, a signal processing section in a reception part of the radio device. A connecting device is further provided for interchangeably connecting outputs of the differential transmission signal section to inputs of the differential reception signal section.

10 Claims, 2 Drawing Sheets

DETERMINATION OF A DIFFERENTIAL OFFSET IN A RADIO DEVICE AND RADIO DEVICE

CROSS-REFERENCE TO RELATED APPLICATION

This application is a continuation of copending International Application No. PCT/DE01/02688, filed Jul. 13, 2001, which designated the United States and was not published in English.

BACKGROUND OF THE INVENTION

Field of the Invention

The invention relates to a method and a device for determining an offset value for an offset occurring in a differential transmission signal section of a radio device.

Signal processing in mobile radio devices (handheld telephones, mobile stations) contain a signal processing in baseband and a signal processing in the radiofrequency range. The corresponding two signal processing sections (baseband and radiofrequency sections) are often realized by separate chips (baseband chip and radiofrequency chip). The baseband chip is responsible for the digital modulation and the D/A conversion of the signal to be transmitted and for the A/D conversion and demodulation of the received signal. The task of the radiofrequency chip is to convert the analog baseband signal to be transmitted into the carrier frequency and to downconvert the received, analog radiofrequency signal into baseband.

It is already known to provide a differential signal transmission at least in sections both in the reception path and in the transmission path. In the case of a differential signal transmission, two signal lines are provided for the transmission of a signal (transmission signal or reception signal), the transmitted signal being produced from the difference between the signals transmitted via the two signal lines. In this case, a disturbance acting on both signal lines is eliminated by the difference formation and does not impair the signal transmission.

One difficulty in differential signal transmission is that an originally offset-free signal can acquire an offset on account of different component behaviors in the two processing paths. The signal offset, also referred to as a differential offset, results in that the difference between the two differential signals is now not the actual signal but rather the actual signal plus the differential offset.

A differential offset can occur both in the transmission path and in the reception path of the radio receiver.

In order to avoid or correct a differential offset, it is already known to measure the differential offset both in the transmission branch and in the reception branch in the context of the quality inspection of the baseband chip. Using the measured values, the baseband chip is then calibrated, i.e. the differential offset is set to the value zero. What is disadvantageous about this procedure, however, is the long time required for the offset measurement and calibration, and also the fact that later aging-dictated and environment-dictated component changes cannot be taken into account with a calibration at the point in time of production.

SUMMARY OF THE INVENTION

It is accordingly an object of the invention to provide a determination of a differential offset in a radio device and a radio device that overcomes the above-mentioned disadvantages of the prior art methods and devices of this general type, with which it is possible, in a simple manner, to determine an offset value for an offset occurring in a differential transmission signal section of a radio device. In particular, the intention is to enable recalibration of the differential transmission signal section during the time when the radio device is used.

With the foregoing and other objects in view there is provided, in accordance with the invention, a method for determining an offset value for an offset occurring in a differential transmission signal section of a radio device. The method includes inputting a test value into an input of the differential transmission signal section, resulting in a first signal being output at a first output of the differential transmission signal section and a second signal being output at a second output of the differential transmission signal section. The first signal is coupled into a first input and the second signal is coupled into a second input of a differential reception signal section of the radio device. A first value of a reception signal is determined and output at an output of the differential reception signal section. The first signal is coupled into the second input and the second signal is coupled into the first input of the differential reception signal section. A second value of the reception signal is determined. The offset value is calculated using the first value, the second value, and the test value.

What is achieved by the idea on which the invention is based, namely of using the differential reception signal section of the radio device for determining the offset value for the differential transmission signal section, is that the determination of the offset value and thus the possibility of calibrating the baseband chip even after the final assembly of the radio device can be carried out at suitable points in time during later use. A further advantage of the concept according to the invention can be seen in the fact that an external measuring station is no longer necessary for determining the offset value for the differential transmission signal section, since the differential reception signal section of the radio device is used for this purpose. The method according to the invention furthermore has the advantage that a differential offset that is possibly present in the reception signal section does not influence the determination of the offset value for the differential transmission signal section, since it is eliminated by taking account of the two measured values obtained with different polarity.

Compensation of the offset occurring in the differential transmission signal section is expediently carried out with the aid of the offset value determined according to the invention. For this purpose, the offset value calculated for the differential transmission signal section is stored and subtracted from the signal values of the transmission signal.

Preferably, the offset compensation is carried out when the radio device is started up or during a time duration without transmission and reception activity within a time slot of a time division multiple access (TDMA) signal structure.

A further advantageous measure of the method according to the invention is characterized in that offsets are in each case calculated both for the differential transmission signal section of an in-phase branch and for the differential transmission signal section of a quadrature branch of the radio device.

Preferably, the offset value calculated by the differential reception signal section is fed to a correction element for correcting the transmission signal by the offset value. The correction element is preferably a correction element connected upstream of the input of the differential transmission signal section. The correction element is generally already present anyway in mobile radio devices for the purpose of compensating for a DC offset—occurring e.g. during modulation—in the non-differential transmission signal path.

With the foregoing and other objects in view there is provided, in accordance with the invention, a radio device. The radio device contains a differential transmission signal section having a transmission signal input and two transmission signal outputs. A differential reception signal section having two reception signal inputs and a reception signal output is provided. A first device is provided for generating a digital test value and for inputting the test value into the transmission signal input of the differential transmission signal section. A second device interchangeably connects the transmission signal outputs of the differential transmission signal section to the reception signal inputs of the differential reception signal section. The second device is connected between the differential reception signal section and the differential transmission signal section. A calculation device is connected to the differential reception signal section for calculating an offset value from at least two values output from the differential reception signal section and a test value.

Other features which are considered as characteristic for the invention are set forth in the appended claims.

Although the invention is illustrated and described herein as embodied in a determination of a differential offset in a radio device and a radio device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
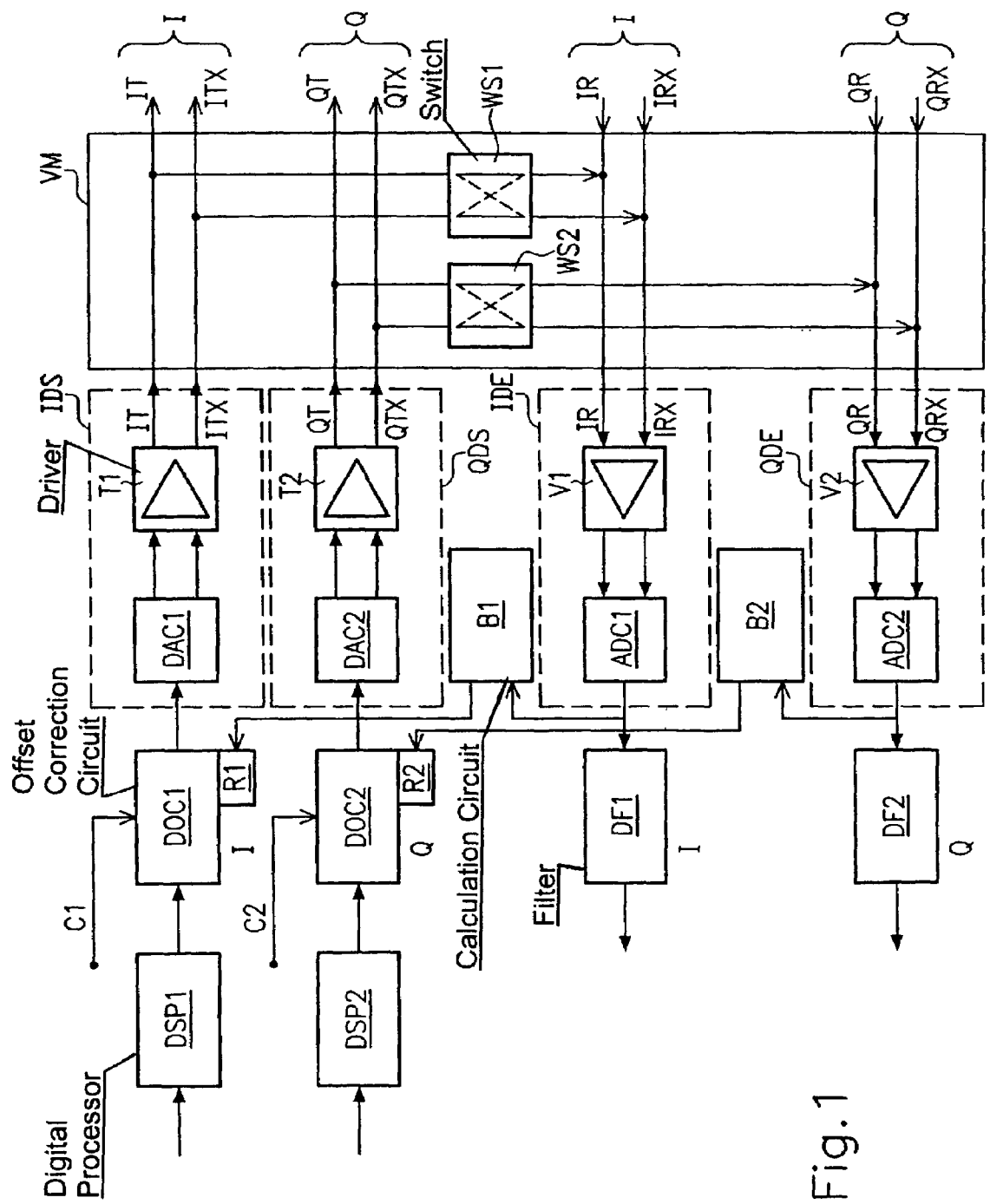
FIG. 1 is a simplified block diagram of a baseband signal processing unit of a radio device according to the invention.

Referring now to the figures of the drawing in detail and first, particularly, to FIG. 1 thereof, there is shown the construction of a baseband signal processing unit—realized e.g. on a baseband chip—for a mobile radio device in the form of a simplified block diagram. A transmission path of the signal processing unit contains, in an (in-phase) I branch, a first digital signal processor DSP1, whose output is fed to an input of a first digital offset correction circuit DOC1. The first digital offset correction circuit DOC1 is data-connected to a correction value register R1. An output of the first digital offset correction circuit DOC1 is input into an input of a first digital-to-analog converter DAC1. The first digital-to-analog converter DAC1 converts the input, a value-discrete transmission signal (of the I branch) into two analog, differential transmission signals. The differential transmission signals are configured such that a difference between the two signals (disregarding an offset generated in the first digital-to-analog converter DAC1) corresponds to the signal value at the input of the first digital-to-analog converter DAC1.

Two analog, differential transmission signals are forwarded to a first driver T1. The first driver T1 carries out a signal amplification and, if appropriate, signal shaping. Two analog, differential transmission signals of the transmission I branch are available at outputs IT and ITX of the first driver T1.

A Q branch of the transmission path is constructed analogously to the I branch and contains a second digital signal processor DSP2, a second digital offset correction circuit DOC2 with a second correction value register R2, a second digital-to-analog converter DAC2 and also a second driver T2. Two analog, differential transmission signals of the Q transmission branch are available at outputs QT and QTX of the second driver T2.

In the example illustrated in FIG. 1, a differential signal processing and transmission takes place in the baseband chip in the region of the digital-to-analog converters DAC1 and DAC2, respectively, and the drivers T1 and T2, respectively. The signal processing sections are referred to below as differential transmission signal section IDS of the I branch and differential transmission signal section QDS of the Q branch. Generally, the differential transmission signal sections IDS and QDS can also contain further components.

The method of operation of the transmission device is now described.

In the digital signal processors DSP1, DSP2, a source signal (e.g. voice signal, video signal) output by a signal source is subjected to a signal processing, which may contain, in a known manner, an analog-to-digital conversion, a source coding, a channel coding, an interleaving and further suitable signal processing steps. Furthermore, the DSP1 and DSP2 perform a shift keying (i.e. digital modulation) of the signal to be transmitted. A Gaussian minimum shift keying (GMSK) is carried out in the case of a GSM transmitter. A modulation may equally well be carried out using a multistage modulation alphabet (e.g. 8PSK (8-phsae shift keying) for the EDGE (Enhanced Data Services for GSM Evolution) standard.

The digital transmission signals output by the DSP1 and DSP2, respectively, may have a DC offset. The compensation of the DC offsets is performed in a known manner by the digital offset correction circuits DOC1 and DOC2. For this purpose, a correction value C1 is communicated to the DOC1 and a correction value C2 to the DOC2 from a non-illustrated circuit for determining the corresponding DC offset correction values. The DC offset compensation is effected by subtracting the correction values C1 and C2, respectively, from the input signal values of the digital offset correction circuits DOC1 and DOC2 respectively (i.e. from the values of the output signals from DSP1 and DSP2, respectively).

The DC offset correction cannot, by its nature, take account of offsets which occur in the signal path downstream of the digital offset correction circuits DOC1 and DOC2 in the differential transmission signal sections IDS and QDS respectively (i.e. are caused by the digital-to-analog converters DAC1/2 and/or the drivers T1/2 in the example illustrated here). According to the invention, the signal processing section associated with the reception path of the radio device is used for taking these (differential) offsets into account.

According to FIG. 1, the baseband chip likewise contains an I branch and a Q branch at a reception end. A differential reception signal section IDE of the I reception branch has a first amplifier V1 and a first analog-to-digital converter ADC1 connected downstream of the first amplifier V1. The first amplifier V1 receives, at two inputs IR and IRX, two signal components of an analog, differential reception signal of the I branch, which is provided by a non-illustrated radiofrequency chip. The two signal components are amplified by V1 and fed to two differential signal inputs of the ADC1. At an output of the ADC1, a value-discrete reception signal of the I reception branch is provided, the signal values of which corresponds to the difference between the two differential analog signals which are present at the inputs of the ADC1. The value-discrete reception signal of the I reception branch at the output of ADC1 is forwarded to a digital filter DF1 and processed further in a customary manner.

The Q reception branch of the baseband chip is constructed analogously and contains a second amplifier V2, a second analog-to-digital converter ADC2 and a second digital filter DF2 at the output of the ADC2. The second amplifier V2 and the second analog-to-digital converter ADC2 form the differential reception signal section QDE of the Q branch. The two inputs of the differential reception signal section QDE are designated by QR and QRX.

Furthermore, a connecting device VM is provided, which makes it possible to feed differential transmission signals of the I and Q branches into the corresponding I and Q branches of the reception path. For this purpose, the connecting device VM contains a first changeover switch WS1 and a second changeover switch WS2. In a first switch position, the first changeover switch WS1 connects the output IT of IDS to the input IR of IDE and the output ITX of IDS to the input IRX of IDE. In a second switch position, the output IT is connected to the input IRX and the output ITX is connected to the input IR. In a first switching position, the second changeover switch WS2 connects the output QT of QDS to the input QR of QDE and the output QTX of QDS to the input QRX of QDE. In a second switch position, the second changeover switch WS2 connects the output QT to the input QRX and the output QTX to the input QR. Furthermore, the changeover switches WS1, WS2 may also be open and, in this position, effect isolation of the transmission path from the reception path.

Furthermore, the baseband chip contains a first and a second calculation unit B1 and B2. An input of the first calculation unit B1 is connected to the output of the differential reception signal section IDE of the I branch, and an output of the first calculation unit B1 is data-connected to the correction value register R1. In an analogous manner, an input of the second calculation unit B2 is connected to the output of the differential reception signal section of the Q branch QDE and an output of the second calculation section B2 is connected to an input of the second correction value register R2.

Figure 2:
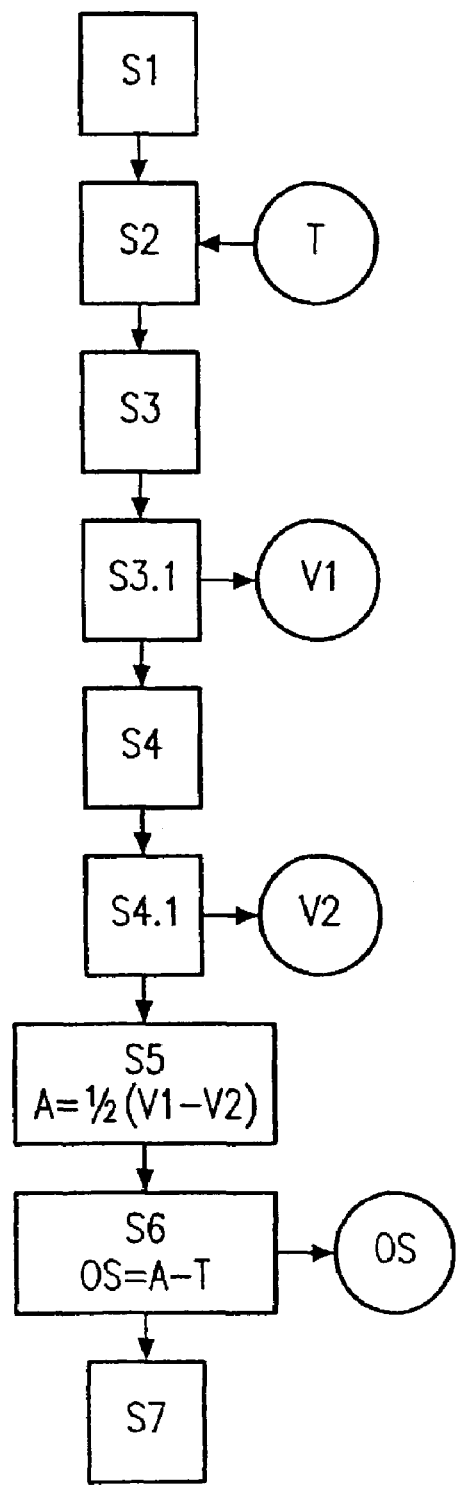
FIG. 2 is a flow chart for elucidating an exemplary embodiment of the method according to the invention.

A sequence by which an offset value is determined for an offset occurring in the differential transmission signal section IDS of the I branch is explained below with reference to FIG. 2. The determination of an offset value for the differential transmission signal section QDS of the Q branch can be carried out at the same time and in an analogous manner.

In a first step S1, both the transmission part and the reception part of the radio device are activated. This step can only be carried out outside a regular transmission or reception activity. By way of example, a simultaneous activation of reception and transmission parts of the radio device can be effected in the context of an initialization step when the radio device is switched on or in dead times during regular operation in which neither a reception activity nor a transmission activity is required. Such dead or guard times are provided in the region of the boundaries of successive time slots, for example, in the case of TDMA.

In a second step S2, a digitally coded test value T is fed to the input of the differential transmission signal section IDS, i.e. to the input of the DAC1. In order to generate the test value T, it is possible (given knowledge of C1) for example to use the DSP1 or to use a non-illustrated test value generating unit which is occasionally applied to the input of the DAC1.

It is assumed that an offset of a value OS (to be determined) occurs in the differential transmission signal section IDS. The signal value occurring at the output IT of the differential transmission signal section IDS is designated by W(IT) and the signal value occurring at the output ITX of IDS is designated by W(ITX). The following relationship then applies to the signal values:

$$W(IT)-W(ITX)=T+OS$$

In a third step S3, a first measurement mode is activated. In this case, the changeover switch WS1 is brought to the first switch position, i.e. IT is connected to IR and ITX is connected to IRX.

In this switch position, in step S3.1, a first (digitally coded) signal value V1 is determined at the output of the differential reception signal section IDE and stored at a suitable location (e.g. in the first calculation unit B1).

In a fourth step S4, a second measurement mode is activated. In this case, the changeover switch WS1 is brought to the second switch position (IT connected to IRX and ITX connected to IR).

In the second measurement mode, in step S4.1, a measurement of the signal value at the output of IDE is again carried out. The second signal value obtained during the measurement in the second mode is designated by V2 and likewise stored.

The measurement sequence is thus ended and the radio device can undergo transition to normal operation again by isolation of the connection between its transmission and reception paths. The determination of the offset value sought for the differential transmission signal section IDS is subsequently pursued further through computation steps.

In a fifth step S5, the following expression $$A=\tfrac{1}{2}(V1-V2)$$

is calculated.

It can be seen that A=T+OS holds true. What is achieved by the difference formation V1−V2 is that an offset that is possibly present in the differential reception signal section IDE has no influence on the value A.

In a sixth step S6, the offset value OS is calculated for the offset in the differential transmission signal section IDS by solving the equation $$OS=A-T.$$

The computation steps S5 and S6 are carried out by the first calculation unit B1. The differential offset value OS sought is thus calculated. By way of example, in the case of a measurement on the individual chip, the value can be output and indicated in a suitable manner or be used directly for the correction of the differential offset.

In the last-mentioned case, in a seventh step S7, the calculated offset value OS is input into the correction value register R1. Starting from this point in time, the differential offset value OS is taken into account in exactly the same way as the DC offset correction value C1 in the case of the digital offset correction in DOC1, i.e. the signal value at the output of DOC1 is also lowered by the offset value OS in addition to the correction with the value C1.

A firmware implemented in the mobile radio device is preferably used for processing the measurement and calibration steps explained with reference to FIG. 2.

I claim:

1. A method for determining an offset value for an offset occurring in a differential transmission signal section of a radio device, which comprises the steps of:
   inputting a test value into an input of the differential transmission signal section, resulting in a first signal being output at a first output of the differential transmission signal section and a second signal being output at a second output of the differential transmission signal section;
   coupling the first signal into a first input and the second signal into a second input of a differential reception signal section of the radio device;
   determining a first value of a reception signal output at an output of the differential reception signal section;
   coupling the first signal into the second input and the second signal into the first input of the differential reception signal section;
   determining a second value of the reception signal; and
   calculating the offset value using the first value, the second value, and the test value.

2. The method according to claim 1, further comprising the step of compensating for the offset in the differential transmission signal section by the steps of:
   storing the offset value for the differential transmission signal section; and
   subtracting the offset value from signal values of a transmission signal.

3. The method according to claim 2, which comprises carrying out an offset compensation each time the radio device is started up.

4. The method according to claim 2, which comprises carrying out an offset compensation within a time domain multiple access time slot during a time duration without transmission and reception activity.

5. The method according to claim 1, which comprises calculating offset values both for the differential transmission signal section of an in-phase branch and for the differential transmission signal section of a quadrature branch of the radio device.

6. A radio device, comprising:
   a differential transmission signal section having a transmission signal input and two transmission signal outputs;
   a differential reception signal section having two reception signal inputs and a reception signal output;
   a first device for generating a digital test value and for inputting the test value into said transmission signal input of said differential transmission signal section;
   a second device for interchangeably connecting said transmission signal outputs of said differential transmission signal section to said reception signal inputs of said differential reception signal section, said second device connected between said differential reception signal section and said differential transmission signal section; and
   a calculation device connected to said differential reception signal section for calculating an offset value from at least two values output from said differential reception signal section and the test value.

7. The radio device according to claim 6, further comprising:
   a memory for storing the offset value for the differential transmission signal section, said memory connected to said calculation device; and
   a correction element for correcting the transmission signal by the offset value, said correction element connected to said first device and to said memory.

8. The radio device according to claim 6, wherein said differential transmission signal section contains a differential digital-to-analog converter for generating two differential analog signals.

9. The radio device according to claim 8, wherein said differential transmission signal section furthermore has an output driver connected to said digital-to-analog converter and receives the two differential analog signals.

10. The radio device according to claim 7, wherein said correction element is connected upstream of said transmission signal input of said differential transmission signal section.

* * * * *